(12) United States Patent
Morris et al.

(10) Patent No.: US 11,956,143 B2
(45) Date of Patent: Apr. 9, 2024

(54) SYSTEMS AND METHODS FOR PROVIDING A MULTICAST DATA STREAM WITHOUT STORING OR RECONSTRUCTING A HEADER OR MAINTAINING STATE

(71) Applicant: Verizon Patent and Licensing Inc., Basking Ridge, NJ (US)

(72) Inventors: Nicklous Dale Morris, Trophy Club, TX (US); David Taft, Keller, TX (US); Luay Jalil, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/931,990

(22) Filed: Sep. 14, 2022

(65) Prior Publication Data
US 2024/0089192 A1   Mar. 14, 2024

(51) Int. Cl.
*H04L 69/22* (2022.01)
*H04L 5/00* (2006.01)
*H04L 45/16* (2022.01)

(52) U.S. Cl.
CPC ............ *H04L 45/16* (2013.01); *H04L 5/0055* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 10,225,187 | B2* | 3/2019 | Pfister | H04L 69/22 |
| 2006/0256740 | A1* | 11/2006 | Koski | H04L 12/189 |
| | | | | 370/278 |
| 2011/0310726 | A1* | 12/2011 | Di | H04N 21/26616 |
| | | | | 370/242 |
| 2013/0035115 | A1* | 2/2013 | Lindegren | H04W 28/0226 |
| | | | | 455/456.3 |
| 2015/0049760 | A1* | 2/2015 | Xu | H04L 45/16 |
| | | | | 370/390 |
| 2015/0181309 | A1* | 6/2015 | Shepherd | H04N 21/64322 |
| | | | | 725/109 |
| 2017/0353382 | A1* | 12/2017 | Gupta | H04L 12/1886 |
| 2021/0409333 | A1* | 12/2021 | Barritt | H04B 7/1851 |

* cited by examiner

*Primary Examiner* — James A Edwards (57) ABSTRACT

A source network device may receive a multicast data stream to be provided to a plurality of network devices of a network, and may generate, for the multicast data stream, a segment routing header that identifies the plurality of network devices to be provided the multicast data stream. The source network device may cause the multicast data stream to be serially provided to the plurality of network devices identified in the segment routing header without requiring the plurality of network devices to store and reconstruct the segment routing header and without requiring the plurality of network devices to maintain state.

20 Claims, 8 Drawing Sheets

| Header | Header Ext Len | Routing Type | Segments Left |
|---|---|---|---|
| Last Entry | Flags | Tag | |
| Segment List[0] (128 bits IPv6 address) | | | |
| *** | | | |
| Segment List[n] (128 bits IPv6 address) | | | |
| Optional Type Length Value Objects (variable) | | | |

SYSTEMS AND METHODS FOR PROVIDING A MULTICAST DATA STREAM WITHOUT STORING OR RECONSTRUCTING A HEADER OR MAINTAINING STATE

BACKGROUND

Multicast Internet protocol (IP) routing protocols are used to distribute data (e.g., audio and/or video streaming broadcasts) to multiple recipients. Using multicast, a source can send a single copy of data to a single multicast address, and the copy of data may then be distributed to an entire group of recipients.

DETAILED DESCRIPTION OF EXAMPLE EMBODIMENTS

The following detailed description of example implementations refers to the accompanying drawings. The same reference numbers in different drawings may identify the same or similar elements.

Multicast is a process intensive method for data (e.g., packet) delivery. For example, when a multicast data stream is to be delivered to multiple network devices (e.g., routers, switches, and/or the like) prior to arriving at a destination, an entire multicast state tree is generated for the multicast data stream. IP multicasting uses a mechanism known as a multicast tree to transmit to information among users of a network. A multicast state tree may enable a single transmission to branch out to desired receivers. Each of the network devices generates the multicast state tree, stores the multicast state tree, and maintains the multicast state tree. However, generating, storing, and maintaining the multicast state tree, at each of the network devices, consumes resources of the network devices and creates congestion and delay for the network devices. Thus, current techniques for delivering a multicast data stream consume computing resources (e.g., processing resources, memory resources, communication resources, and/or the like), networking resources, and/or other resources associated with generating a multicast state tree by each of the network devices that delivers the multicast data stream, storing the multicast state tree by each of the network devices, maintaining the multicast state tree by each of the network devices, losing the multicast data stream due to congestion at the network devices, attempting to recover lost multicast data stream, and/or the like.

Some implementations described herein provide a network device that provides a multicast data stream without storing or reconstructing a header or maintaining state. For example, a source network device may receive or generate a multicast data stream to be provided to a plurality of network devices of a network, and may generate, for the multicast data stream, a segment routing header that identifies the plurality of network devices to be provided the multicast data stream. The source network device may cause the multicast data stream to be serially provided to the plurality of network devices identified in the segment routing header without requiring the plurality of network devices to store and reconstruct the segment routing header and without requiring the plurality of network devices to maintain state.

In this way, a network device provides a multicast data stream without storing or reconstructing a header or maintaining state. For example, a source network device may generate a segment routing header that identifies multiple network devices to receive a multicast data stream, and may provide the segment routing header and the multicast data stream to a first network device, of the multiple network devices, identified by the segment routing header. The first network device may store the multicast data stream and may remove, from the segment routing header, an identifier identifying the first network device to generate a modified segment routing header. The first network device may provide the modified segment routing header and the multicast data stream to a second network device, of the multiple network devices, identified by the modified segment routing header. The process may continue until each of the multiple network devices receives the multicast data stream. Thus, implementations described herein may conserve computing resources, networking resources, and/or other resources that would have otherwise been consumed by generating a multicast state tree by each of the network devices that delivers the multicast data stream, storing the multicast state tree by each of the network devices, maintaining the multicast state tree by each of the network devices, losing the multicast data stream due to congestion at the network devices, attempting to recover lost multicast data stream, and/or the like.

Implementations described herein may be utilized with segment routing. Segment routing may enable chaining of service functions (e.g., a firewall to an application delivery controller and to a network device of choice) by stacking segment identifications (SIDs) in a series. This is accomplished via a segment routing header which includes the SIDs in an order of operation. This inherent capability may enable single data stream delivery to the multiple different end point devices, as described in the implementations herein.

Figure 1A:
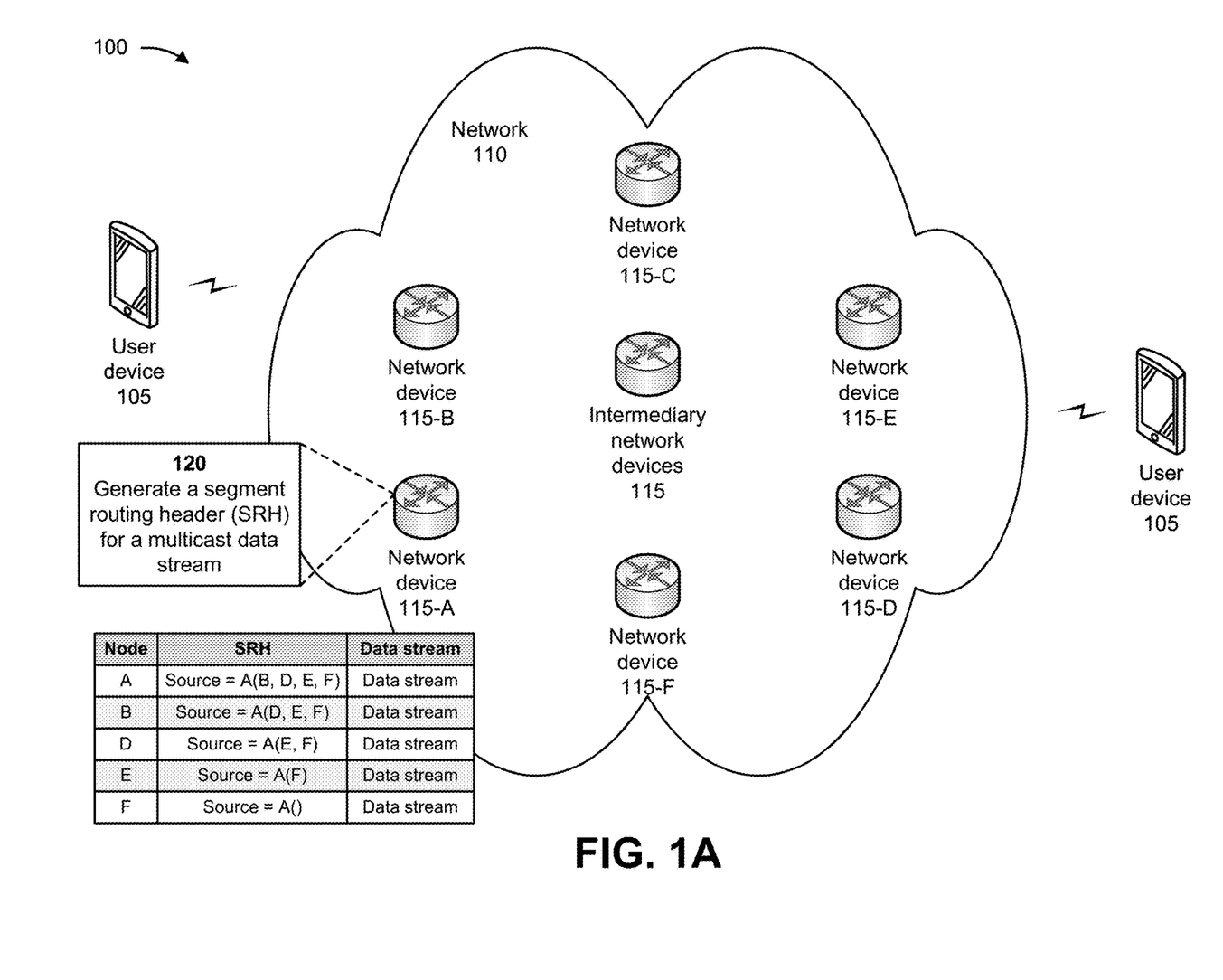
FIGS. 1A-1E are diagrams of an example associated with providing a multicast data stream without storing or reconstructing a header or maintaining state.
Figure 1B:
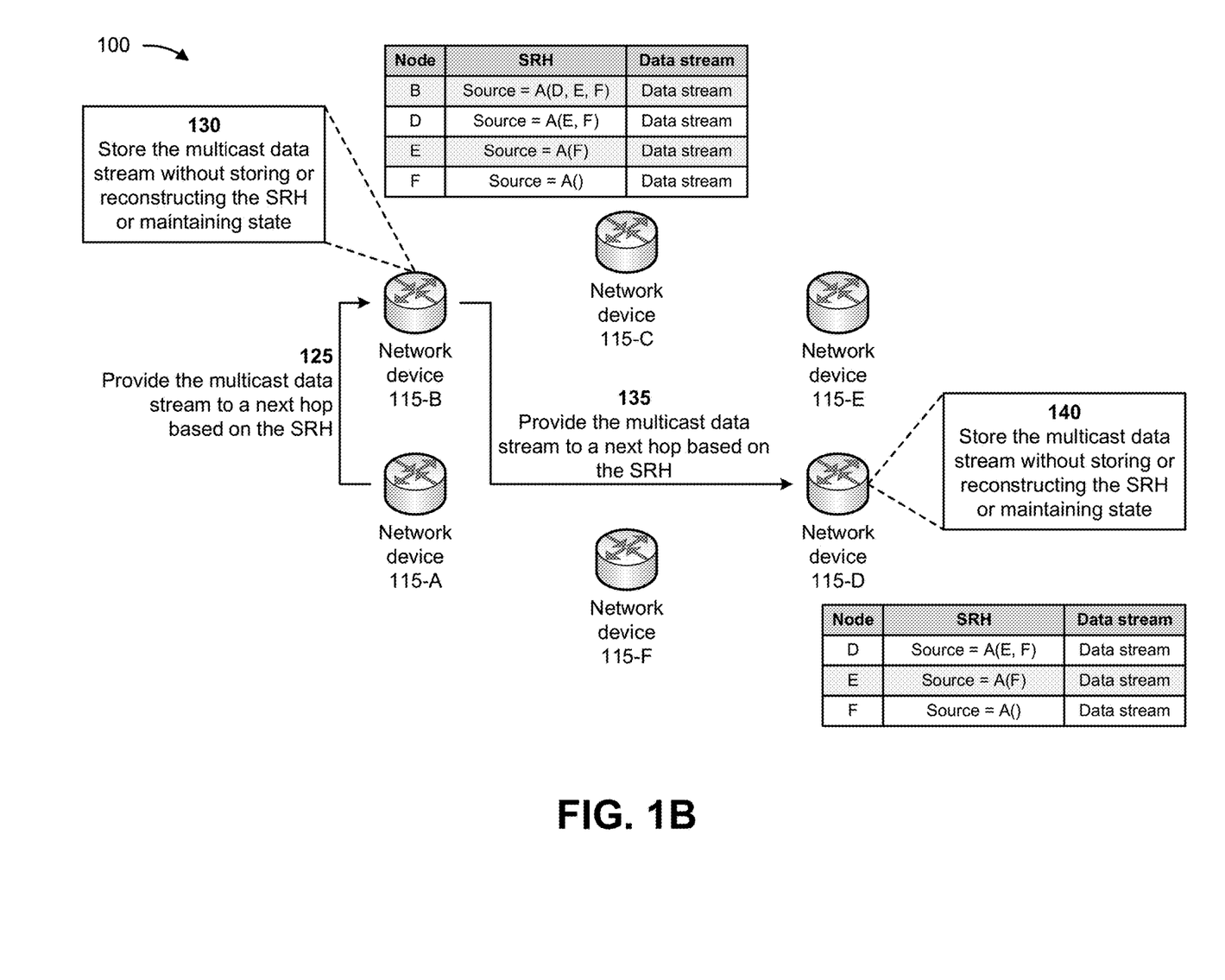
Figure 1C:
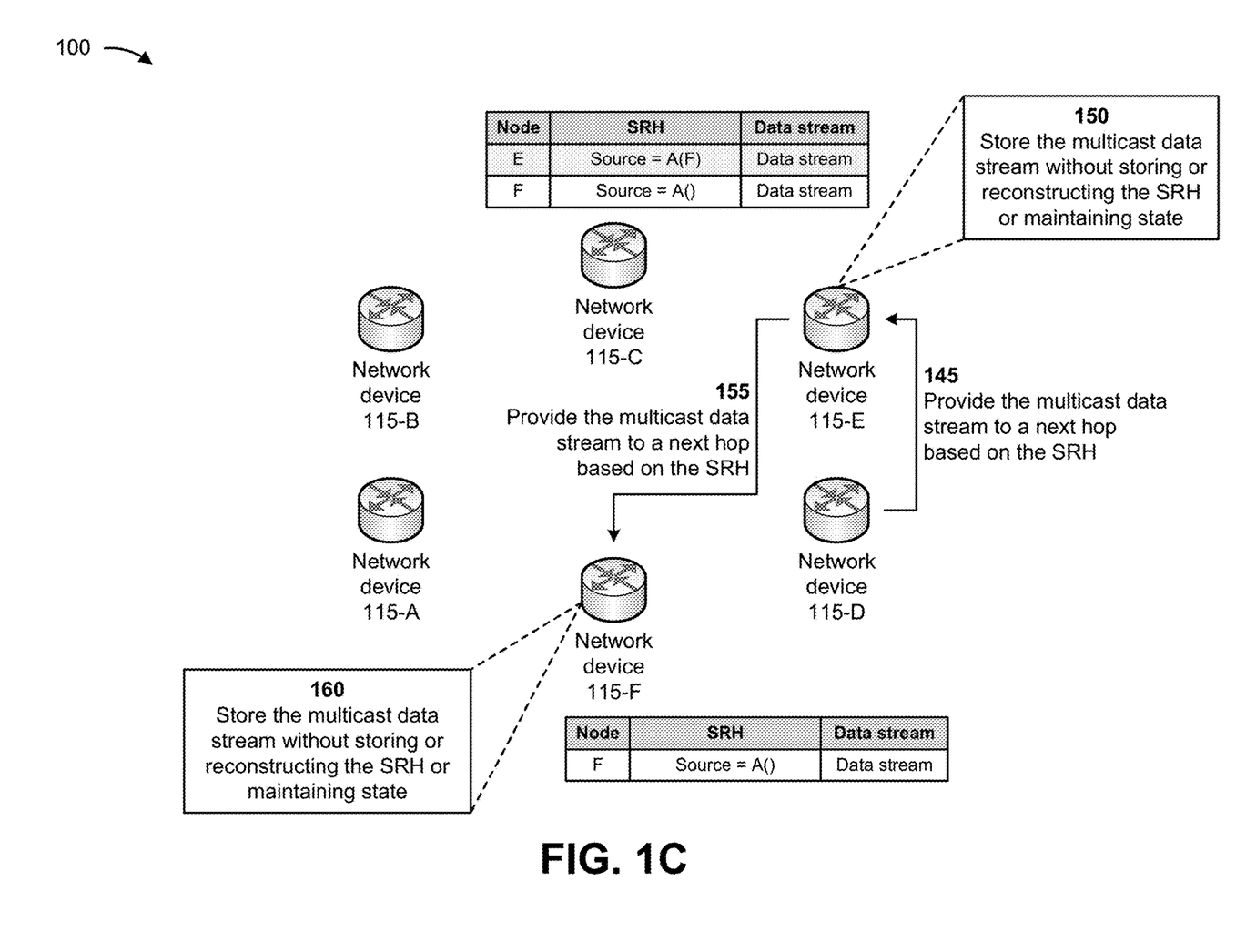

FIGS. 1A-1E are diagrams of an example 100 associated with providing a multicast data stream without storing or reconstructing a header or maintaining state. As shown in FIGS. 1A-1C, the example 100 includes user devices 105 and a network 110 of network devices 115 (e.g., a first network device 115-A, a second network device 115-B, a third network device 115-C, a fourth network device 115-D, a fifth network device 115-E, a sixth network device 115-F, and intermediary network devices 115). Further details of the user devices 105, the network 110, and the network devices 115 are provided elsewhere herein.

As shown in FIG. 1A, and reference number 120, the first network device 115-A may generate a segment routing header (SRH) for a multicast data stream. For example, the first network device 115-A may be source network device and receive and/or generate the multicast data stream to be provided to a plurality of network devices 115 of the network 110. In some implementations, the first network device 115-A may receive the multicast data stream from the user device 105. The multicast data stream may include a network traffic stream, an Internet protocol television (IPTV) stream, a cache stream, and/or the. In some implementations, the network 110 may include a segment routing over an Internet protocol (IP) version 6 (SRv6) data plane network, and the first network device 115-A may maintain state associated with the multicast data stream.

The first network device 115-A may generate, for the multicast data stream, a segment routing header that includes data identifying the source network device (e.g., the first network device 115-A), and each of the plurality of network devices 115. In some implementations, the first network device 115-A may generate a routing table that includes a node field, a segment routing header field, and a data stream field. The node field may include data identifying the network devices 115 associated with transmitting the multicast data stream through the network 110. For example, the node field may indicate that the multicast data stream is to be provided from the first network device 115-A, to the second network device 115-B, the fourth network device 115-D, the fifth network device 115-E, and the sixth network device 115-E. The segment routing header field may identify the segment routing header at each of the network devices 115 associated with transmitting the multicast data stream through the network 110. For example, the segment routing header field may identify a first segment routing header (e.g., Source=A(B, D, E, F)) for the first network device 115-A, a second segment routing header (e.g., Source=A(D, E, F)) for the second network device 115-B, a third segment routing header (e.g., Source=A(E, F)) for the fourth network device 115-D, a fourth segment routing header (e.g., Source=A(F)) for the fifth network device 115-E, and a fifth segment routing header (e.g., Source=AO) for the sixth network device 115-F. The data stream fields may identify the multicast data stream.

As shown in FIG. 1B, and by reference number 125, the first network device 115-A may provide the multicast data stream to a next hop (e.g., the second network device 115-B) based on the SRH. For example, the first network device 115-A may cause the multicast data stream to be serially provided to the plurality of network devices 115 identified in the segment routing header without requiring the plurality of network devices 115 to store and reconstruct the segment routing header and without requiring the plurality of network devices 115 to maintain state. A first entry in the segment routing header may identify a next hop for the multicast data stream, and the first network device 115-A may provide the multicast data stream to the next hop. Since the first entry in the segment routing header identifies the second network device 115-B, the first network device 115-A may provide the multicast data stream and the segment routing header to the second network device 115-B.

As further shown in FIG. 1B, and by reference number 130, the second network device 115-B may store the multicast data stream without storing or reconstructing the SRH or maintaining state. For example, the second network device 115-B may receive the multicast data stream and the segment routing header from the first network device 115-A. The second network device 115-B may store the multicast data stream, but may not store or reconstruct the segment routing header. The second network device 115-B also may not maintain state associated with the multicast data stream. The second network device 115-B may remove information identifying the second network device 115-B from the segment routing header, which may reduce a size of the segment routing header. In this way, the second network device 115-B may reduce processing and memory utilization by the second network device 115-B.

As further shown in FIG. 1B, and by reference number 135, the second network device 115-B may provide the multicast data stream to a next hop (e.g., the fourth network device 115-D) based on the SRH. For example, a second entry in the segment routing header may identify a next hop for the multicast data stream, and the second network device 115-B may provide the multicast data stream to the next hop. Since the second entry in the segment routing header identifies the fourth network device 115-D, the second network device 115-B may provide the multicast data stream and the reduced segment routing header to the fourth network device 115-D.

As further shown in FIG. 1B, and by reference number 140, the fourth network device 115-D may store the multicast data stream without storing or reconstructing the SRH or maintaining state. For example, the fourth network device 115-D may receive the multicast data stream and the reduced segment routing header from the second network device 115-B. The fourth network device 115-D may store the multicast data stream, but may not store or reconstruct the segment routing header. The fourth network device 115-D also may not maintain state associated with the multicast data stream. The fourth network device 115-D may remove information identifying the fourth network device 115-D from the segment routing header, which may further reduce a size of the segment routing header. In this way, the fourth network device 115-D may reduce processing and memory utilization by the fourth network device 115-D.

As shown in FIG. 1C, and by reference number 145, the fourth network device 115-D may provide the multicast data stream to a next hop (e.g., the fifth network device 115-E) based on the SRH. For example, a third entry in the segment routing header may identify a next hop for the multicast data stream, and the fourth network device 115-D may provide the multicast data stream to the next hop. Since the third entry in the segment routing header identifies the fifth network device 115-E, the fourth network device 115-D may provide the multicast data stream and the reduced segment routing header to the fifth network device 115-E.

As further shown in FIG. 1C, and by reference number 150, the fifth network device 115-E may store the multicast data stream without storing or reconstructing the SRH or maintaining state. For example, the fifth network device 115-E may receive the multicast data stream and the reduced segment routing header from the fourth network device 115-D. The fifth network device 115-E may store the multicast data stream, but may not store or reconstruct the segment routing header. The fifth network device 115-E also may not maintain state associated with the multicast data stream. The fifth network device 115-E may remove information identifying the fifth network device 115-E from the segment routing header, which may further reduce a size of the segment routing header. In this way, the fifth network device 115-E may reduce processing and memory utilization by the fifth network device 115-E.

As further shown in FIG. 1C, and by reference number 155, the fifth network device 115-E may provide the multicast data stream to a next hop (e.g., the sixth network device 115-F) based on the SRH. For example, a fourth entry in the segment routing header may identify a next hop for the multicast data stream, and the fifth network device 115-E may provide the multicast data stream to the next hop. Since the fourth entry in the segment routing header identifies the sixth network device 115-F, the fifth network device 115-E may provide the multicast data stream and the reduced segment routing header to the sixth network device 115-F.

As further shown in FIG. 1C, and by reference number 160, the sixth network device 115-F may store the multicast data stream without storing or reconstructing the SRH or maintaining state. For example, the sixth network device 115-F may receive the multicast data stream and the reduced segment routing header from the fifth network device 115-E. The sixth network device 115-F may store the multicast data stream, but may not store or reconstruct the segment routing header. The sixth network device 115-F also may not maintain state associated with the multicast data stream. The sixth network device 115-F may remove information identifying the sixth network device 115-F from the segment routing header, which may further reduce a size of the segment routing header. In this way, the sixth network device 115-F may reduce processing and memory utilization by the sixth network device 115-F.

Figure 1D:
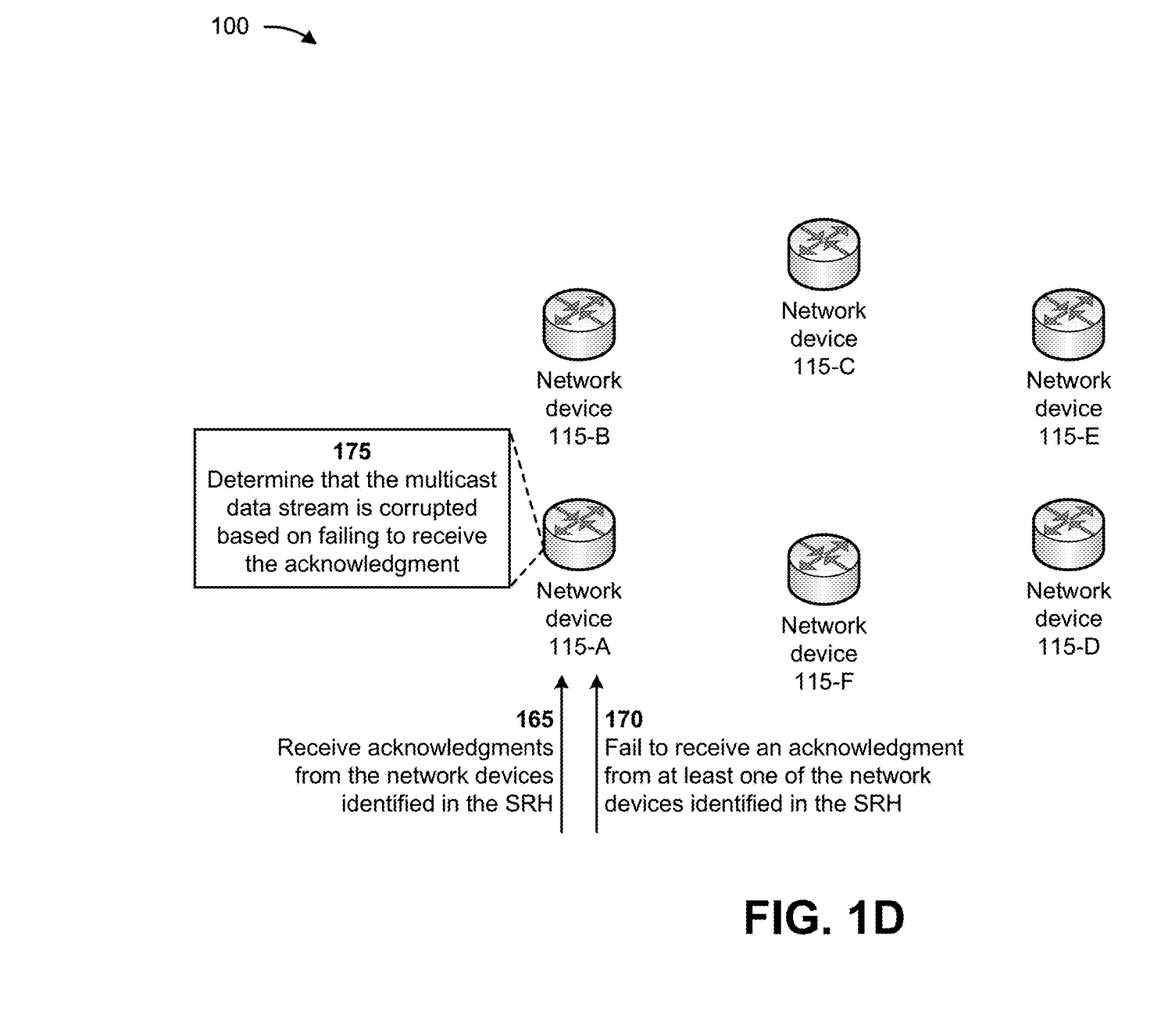

As shown in FIG. 1D, and by reference number 165, the first network device 115-A may receive respective acknowledgments from the network devices 115 identified in the SRH. For example, the first network device 115-A may receive respective acknowledgements from the second network device 115-B, the fourth network device 115-D, the fifth network device 115-E, and the sixth network device 115-F. When the first network device 115-A receives the respective acknowledgements from the network devices 115 identified in the segment routing header, the first network device 115-A may determine that the multicast data stream is not corrupted.

As further shown in FIG. 1D, and by reference number 170, the first network device 115-A may fail to receive an acknowledgment from at least one of the network devices 115 identified in the SRH. For example, at least one of the second network device 115-B, the fourth network device 115-D, the fifth network device 115-E, or the sixth network device 115-F may fail to provide an acknowledgement to the first network device 115-A upon receipt of the multicast data stream. Alternatively, at least one of the second network device 115-B, the fourth network device 115-D, the fifth network device 115-E, or the sixth network device 115-F may generate a negative acknowledgement (e.g., indicating that the multicast data is corrupted), and may provide the negative acknowledgement to the first network device 115-A.

As further shown in FIG. 1D, and by reference number 170, the first network device 115-A may determine that the multicast data stream is corrupted based on failing to receive the acknowledgment. For example, the first network device 115-A may fail receive an acknowledgement from at least one of the second network device 115-B, the fourth network device 115-D, the fifth network device 115-E, or the sixth network device 115-F. Alternatively, at least one of the second network device 115-B, the fourth network device 115-D, the fifth network device 115-E, or the sixth network device 115-F may provide a negative acknowledgement to the first network device 115-A. The first network device 115-A may determine that the multicast data stream is corrupted based on failing to receive the acknowledgment from at least one of the second network device 115-B, the fourth network device 115-D, the fifth network device 115-E, or the sixth network device 115-F. Alternatively, the first network device 115-A may determine that the multicast data stream is corrupted based on receiving the negative acknowledgment from at least one of the second network device 115-B, the fourth network device 115-D, the fifth network device 115-E, or the sixth network device 115-F.

In some implementations, the first network device 115-A may perform one or more actions based on determining that the multicast data stream is corrupted. For example, the first network device 115-A may notify the plurality of network devices 115 that the multicast data stream is corrupted, may prevent the multicast data stream from being provided to a user device 105, may cause the plurality of network devices 115 to remove the multicast data stream from storage, and/or the like. In some implementations, when the first network device 115-A determines that the multicast data stream is not corrupted, the first network device 115-A may cause the multicast data stream to be provided to one or more user devices 105, via the plurality of network devices 115, with best effort delivery, may cause the multicast data stream to be provided to one or more user devices 105, via the plurality of network devices 115, with a particular quality of service (QoS) (e.g., a guaranteed QoS), and/or the like. In some implementations, the intermediary network devices 115 may receive and forward the multicast data stream without storing and reconstructing the segment routing header and without maintaining state.

Figure 1E:
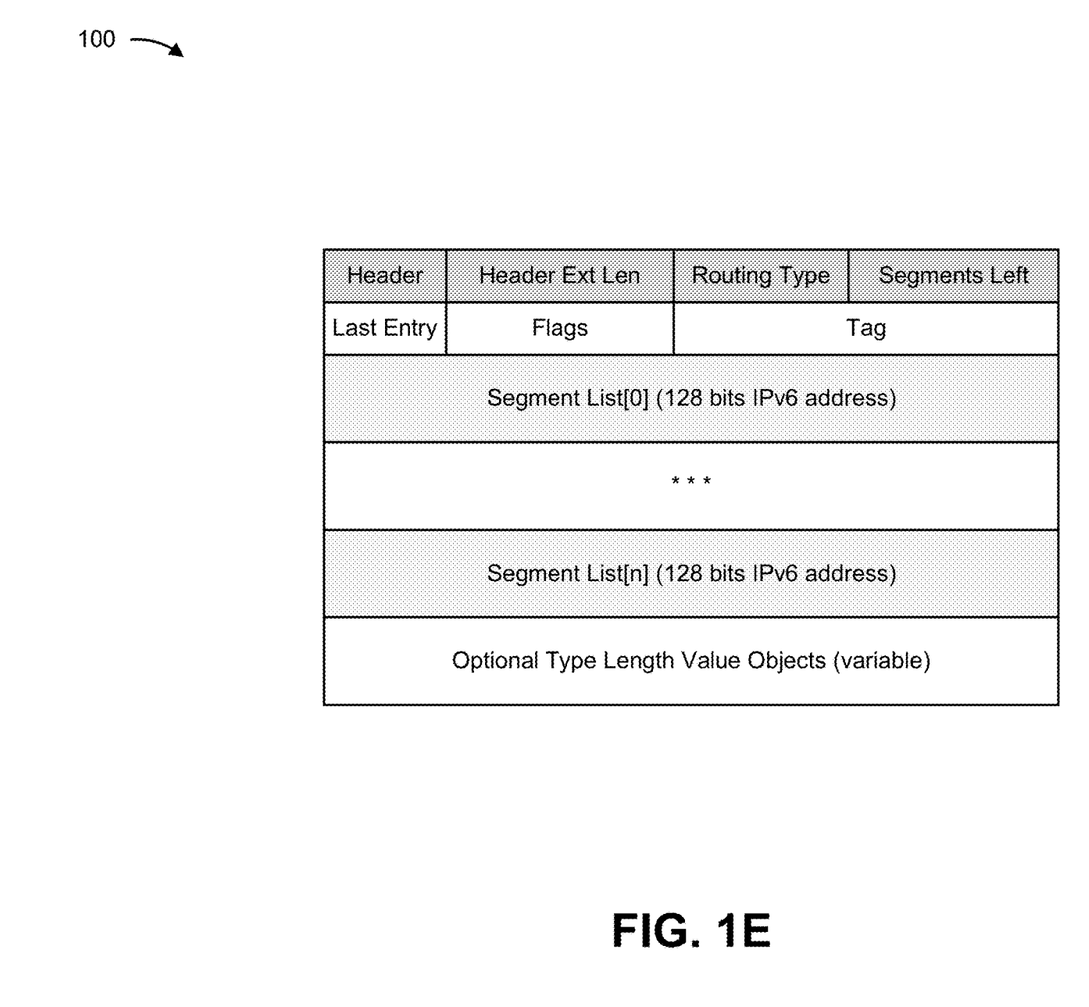

FIG. 1E depicts an example segment routing header generated by the first network device 115-A. As shown, the example segment routing header may include data identifying the segment routing header (e.g., Header) a length of the segment routing header (e.g., Header Est Len), a routing type associated with the multicast data stream (e.g., Routing Type), a quantity of segments remaining in the segment routing header (e.g., Segments Left), a last entry, flags, a tag, a segment list of network addresses (e.g., 128 bit IPv6 addresses) of the plurality of network devices 115, and an optional type, length, and value objects variable.

In this way, a network device provides a multicast data stream without storing or reconstructing a header or maintaining state. For example, a source network device may generate a segment routing header that identifies multiple network devices to receive a multicast data stream, and may provide the segment routing header and the multicast data stream to a first network device, of the multiple network devices, identified by the segment routing header. The first network device may store the multicast data stream and may remove, from the segment routing header, an identifier identifying the first network device to generate a modified segment routing header. The first network device may provide the modified segment routing header and the multicast data stream to a second network device, of the multiple network devices, identified by the modified segment routing header. The process may continue until each of the multiple network devices receives the multicast data stream. Thus, implementations described herein may conserve computing resources, networking resources, and/or other resources that would have otherwise been consumed by generating a multicast state tree by each of the network devices that delivers the multicast data stream, storing the multicast state tree by each of the network devices, maintaining the multicast state tree by each of the network devices, losing the multicast data stream due to congestion at the network devices, attempting to recover lost multicast data stream, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
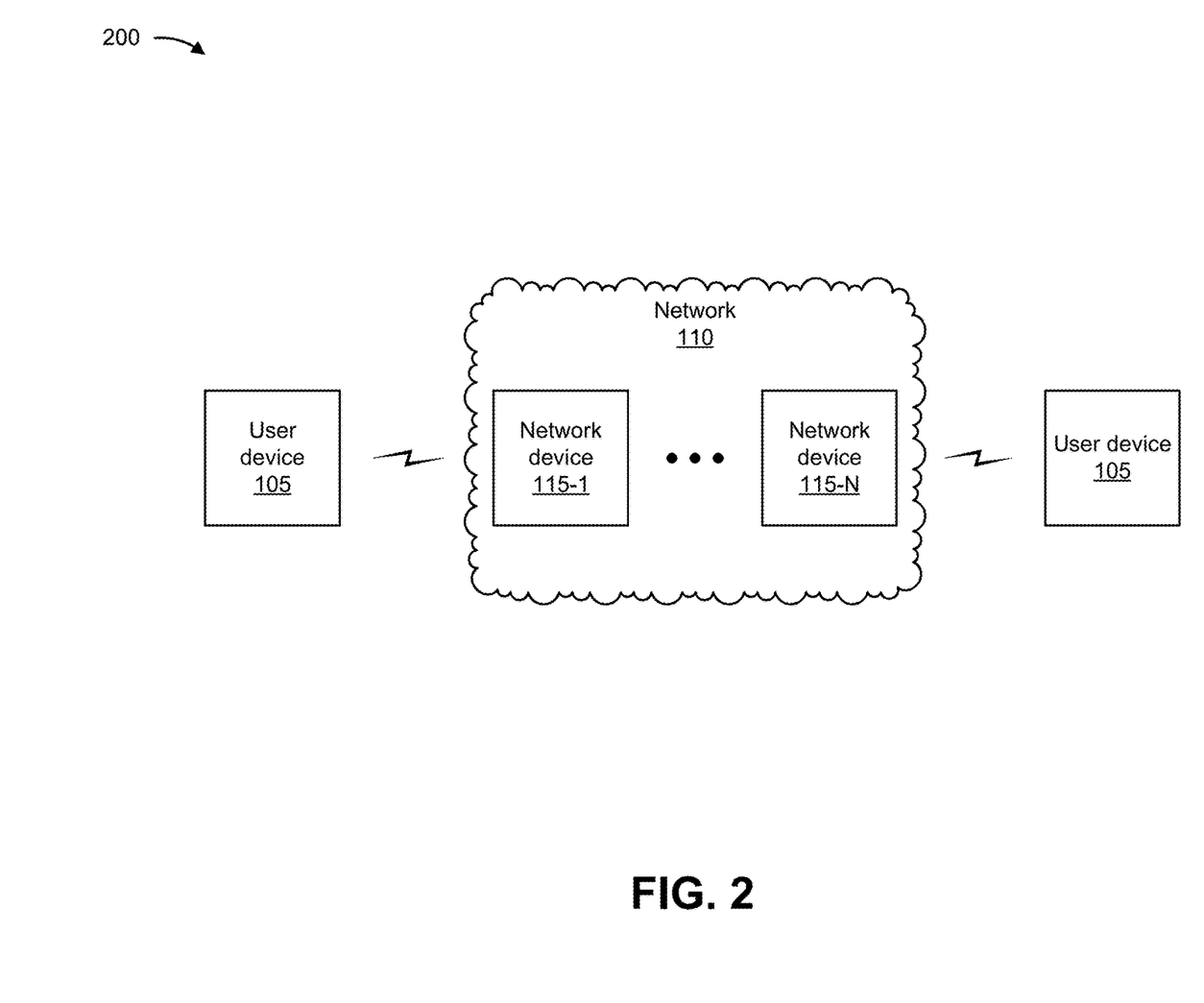
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include user devices 105, the network 110, and a group of the network devices 115 (shown as network device 115-1 through network device 115-N). The devices of the environment 200 may interconnect via wired connections, wireless connections, or a combination of wired and wireless connections.

The user device 105 includes one or more devices capable of receiving, generating, storing, processing, and/or providing information, such as information described herein. For example, the user device 105 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, a television, or a similar type of device. In some implementations, the user device 105 may receive network traffic from and/or may provide network traffic to other user devices 105, via the network 110 (e.g., by routing packets using the network devices 115 as intermediaries).

The network 110 includes one or more wired and/or wireless networks. For example, the network 110 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The network device 115 includes one or more devices capable of receiving, processing, storing, routing, and/or providing traffic (e.g., a packet or other information or metadata) in a manner described herein. For example, the network device 115 may include a router, such as a label switching router (LSR), a label edge router (LER), an ingress router, an egress router, a provider router (e.g., a provider edge router or a provider core router), a virtual router, or another type of router. Additionally, or alternatively, the network device 115 may include a gateway, a switch, a firewall, a hub, a bridge, a reverse proxy, a server (e.g., a proxy server, a cloud server, or a data center server), a load balancer, and/or a similar device. In some implementations, the network device 115 may be a physical device implemented within a housing, such as a chassis. In some implementations, the network device 115 may be a virtual device implemented by one or more computer devices of a cloud computing environment or a data center. In some implementations, a group of network devices 115 may be a group of data center nodes that are used to route traffic flow through the network 110.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
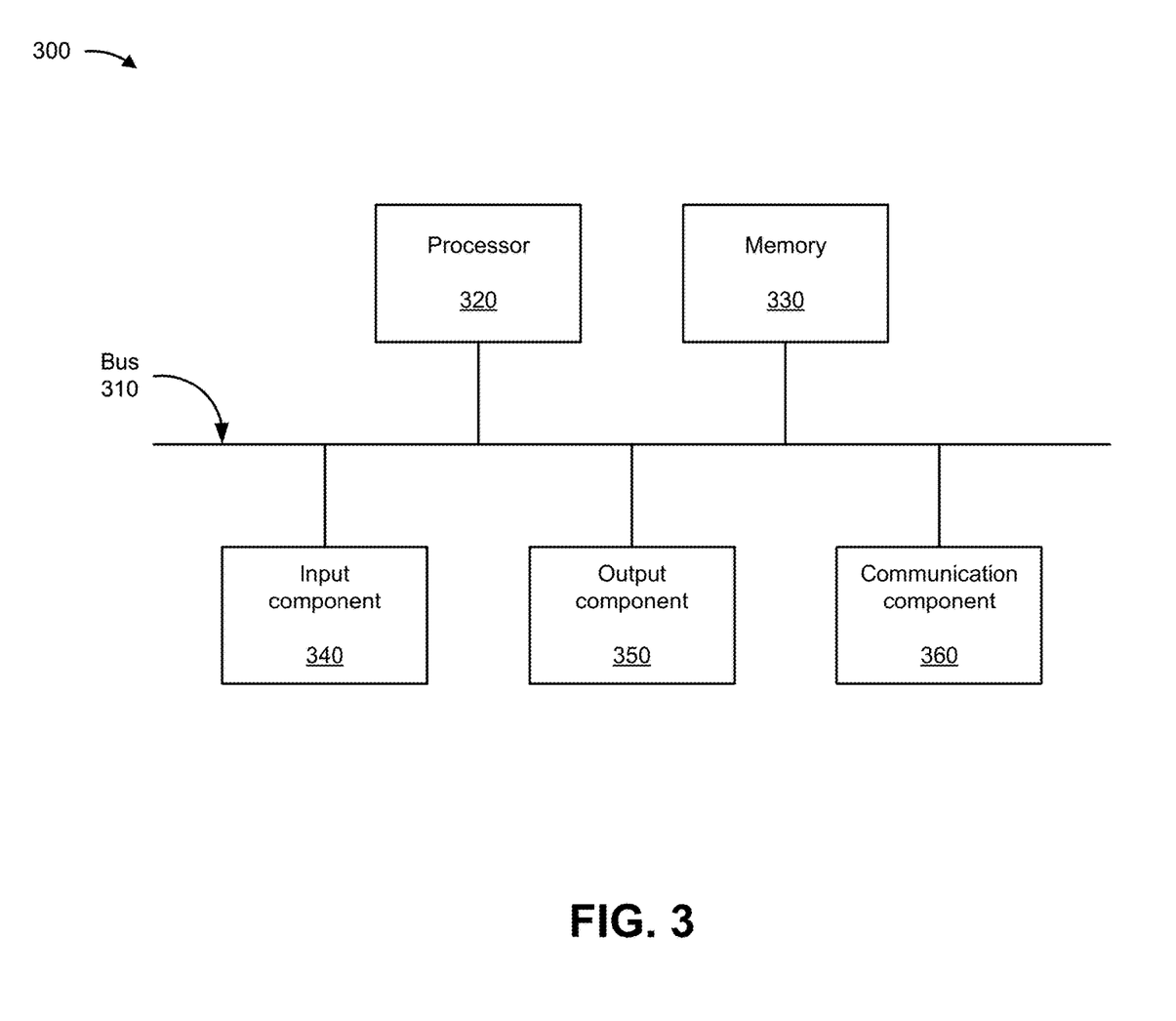
FIG. 3 is a diagram of example components of one or more devices of FIG. 2.

FIG. 3 is a diagram of example components of a device 300, which may correspond to the user device 105 and/or the network device 115. In some implementations, the user device 105 and/or the network device 115 may include one or more devices 300 and/or one or more components of the device 300. As shown in FIG. 3, the device 300 may include a bus 310, a processor 320, a memory 330, an input component 340, an output component 350, and a communication component 360.

The bus 310 includes a component that enables wired and/or wireless communication among the components of the device 300. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform a function. The memory 330 includes a random-access memory, a read only memory, and/or another type of memory (e.g., a flash memory, a magnetic memory, and/or an optical memory).

The input component 340 enables the device 300 to receive input, such as user input and/or sensed inputs. For example, the input component 340 may include a touch screen, a keyboard, a keypad, a mouse, a button, a microphone, a switch, a sensor, a global positioning system component, an accelerometer, a gyroscope, and/or an actuator. The output component 350 enables the device 300 to provide output, such as via a display, a speaker, and/or one or more light-emitting diodes. The communication component 360 enables the device 300 to communicate with other devices, such as via a wired connection and/or a wireless connection. For example, the communication component 360 may include a receiver, a transmitter, a transceiver, a modem, a network interface card, and/or an antenna.

The device 300 may perform one or more processes described herein. For example, a non-transitory computer-readable medium (e.g., the memory 330) may store a set of instructions (e.g., one or more instructions, code, software code, and/or program code) for execution by the processor 320. The processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
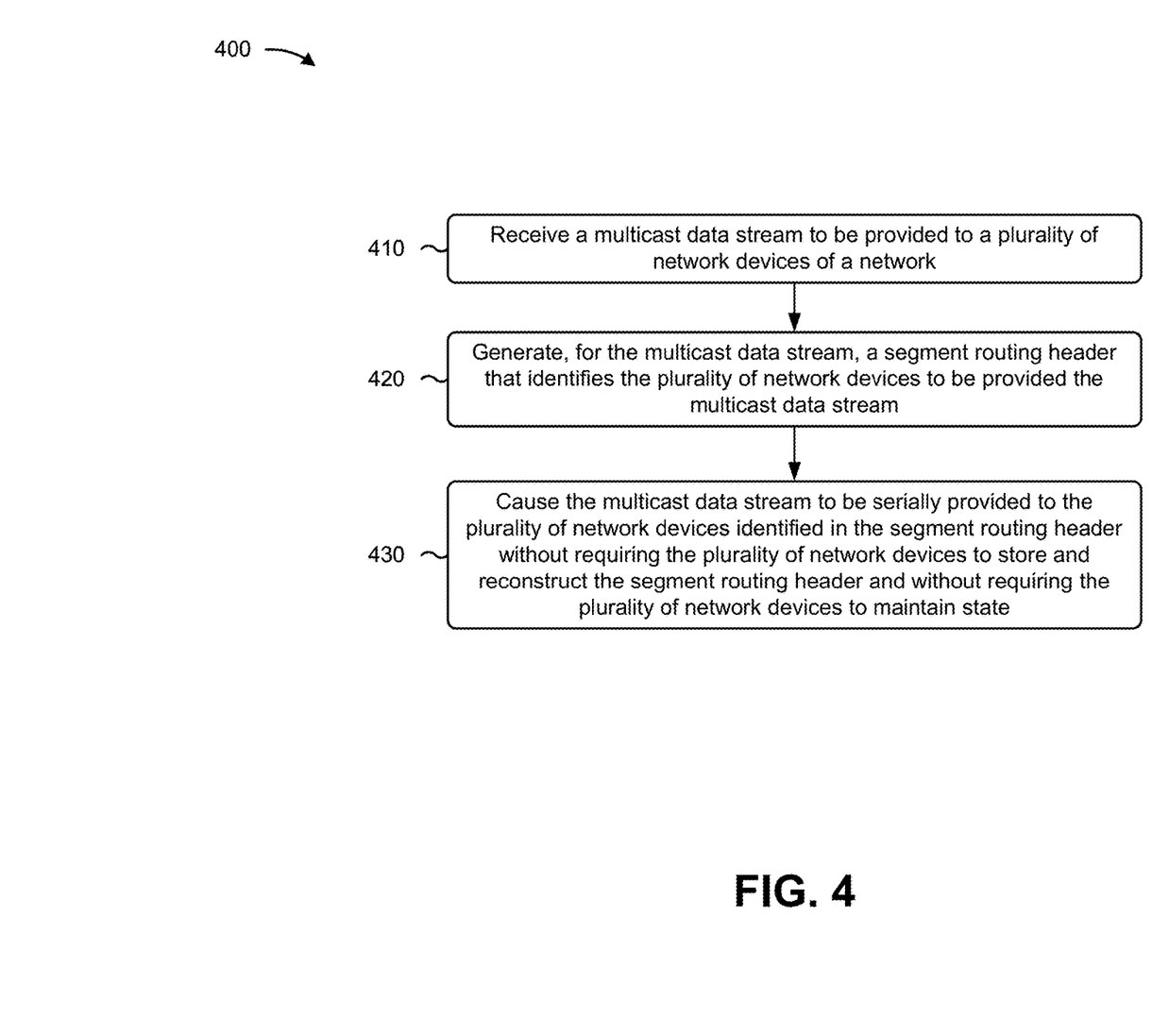
FIG. 4 is a flowchart of an example process for providing a multicast data stream without storing or reconstructing a header or maintaining state.

FIG. 4 is a flowchart of an example process 400 for providing a multicast data stream without storing or reconstructing a header or maintaining state. In some implementations, one or more process blocks of FIG. 4 may be performed by a network device (e.g., the network device 115). In some implementations, one or more process blocks of FIG. 4 may be performed by another device or a group of devices separate from or including the network device, such as another network device (e.g., the network device 115). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a multicast data stream to be provided to a plurality of network devices of a network (block 410). For example, the source network device may receive a multicast data stream to be provided to a plurality of network devices of a network, as described above. In some implementations, the multicast data stream includes one or more of a network traffic stream, an Internet protocol television stream, or a cache stream. In some implementations, the network is a segment routing over an Internet protocol version 6 data plane network. In some implementations, state is maintained in the source network device.

As further shown in FIG. 4, process 400 may include generating, for the multicast data stream, a segment routing header that identifies the plurality of network devices to be provided the multicast data stream (block 420). For example, the source network device may generate, for the multicast data stream, a segment routing header that identifies the plurality of network devices to be provided the multicast data stream, as described above. In some implementations, the segment routing header includes data identifying the source network device, and each of the plurality of network devices. In some implementations, the segment routing header includes data identifying a length of the segment routing header, a routing type associated with the multicast data stream, a quantity of segments remaining in the segment routing header, and a segment list of network addresses of the plurality of network devices.

As further shown in FIG. 4, process 400 may include causing the multicast data stream to be serially provided to the plurality of network devices identified in the segment routing header without requiring the plurality of network devices to store and reconstruct the segment routing header and without requiring the plurality of network devices to maintain state (block 430). For example, the source network device may cause the multicast data stream to be serially provided to the plurality of network devices identified in the segment routing header without requiring the plurality of network devices to store and reconstruct the segment routing header and without requiring the plurality of network devices to maintain state, as described above.

In some implementations, causing the multicast data stream to be serially provided to the plurality of network devices includes providing the segment routing header and the multicast data stream to a first network device, of the plurality of network devices, identified in the segment routing header, to cause the first network device to store the multicast data stream, remove a first identifier of the first network device from the segment routing header, and provide the segment routing header and the multicast data stream to a second network device, of the plurality of network devices, identified in the segment routing header. In some implementations, the second network device is caused to store the multicast data stream, remove a second identifier of the second network device from the segment routing header, and provide the segment routing header and the multicast data stream to a third network device, of the plurality of network devices, identified in the segment routing header.

In some implementations, process 400 includes determining that the multicast data stream is corrupted based on failing to receive an acknowledgement from at least one of the plurality of network devices identified in the segment routing header, and performing one or more actions based on determining that the multicast data stream is corrupted. In some implementations, performing the one or more actions includes notifying the plurality of network devices that the multicast data stream is corrupted, preventing the multicast data stream from being provided to a user device, or causing the plurality of network devices to remove the multicast data stream from storage.

In some implementations, process 400 includes receiving respective acknowledgements from the plurality of network devices identified in the segment routing header. In some implementations, process 400 includes causing the multicast data stream to be provided to one or more user devices, via the plurality of network devices, with best effort delivery. In some implementations, process 400 includes causing the multicast data stream to be provided to one or more user devices, via the plurality of network devices, with a particular quality of service.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a source network device, a multicast data stream to be provided to a plurality of network devices of a network;
generating, by the source network device and for the multicast data stream, a segment routing header that identifies the plurality of network devices to be provided the multicast data stream,
wherein information identifying a respective network device, of the plurality of network devices, is configured to be removed by the respective network device from the segment routing header without storing the segment routing header and without reconstructing the segment routing header; and
causing, by the source network device, the multicast data stream to be serially provided to the plurality of network devices identified in the segment routing header based on each of the plurality of network devices removing the information identifying the respective network device from the segment routing header.

2. The method of claim 1, wherein the multicast data stream includes one or more of:
a network traffic stream,
an Internet protocol television stream, or
a cache stream.

3. The method of claim 1, wherein the segment routing header includes data identifying:
the source network device, and
each of the plurality of network devices.

4. The method of claim 1, wherein causing the multicast data stream to be serially provided to the plurality of network devices comprises:
providing the segment routing header and the multicast data stream to a first network device, of the plurality of network devices, identified in the segment routing header, to cause the first network device to store the multicast data stream, remove a first identifier of the first network device from the segment routing header, and provide the segment routing header and the multicast data stream to a second network device, of the plurality of network devices, identified in the segment routing header.

5. The method of claim 4, wherein the second network device is caused to store the multicast data stream, remove a second identifier of the second network device from the segment routing header, and provide the segment routing header and the multicast data stream to a third network device, of the plurality of network devices, identified in the segment routing header.

6. The method of claim 1, further comprising:
determining that the multicast data stream is corrupted based on failing to receive an acknowledgement from at least one of the plurality of network devices identified in the segment routing header; and
performing one or more actions based on determining that the multicast data stream is corrupted.

7. The method of claim 6, wherein performing the one or more actions comprises one or more of:
notifying the plurality of network devices that the multicast data stream is corrupted;
preventing the multicast data stream from being provided to a user device; or
causing the plurality of network devices to remove the multicast data stream from storage.

8. A source network device, comprising:
one or more processors configured to:
receive a multicast data stream to be provided to a plurality of network devices of a network;
generate, for the multicast data stream, a segment routing header that identifies the plurality of network devices to be provided the multicast data stream,
wherein information identifying a respective network device, of the plurality of network devices, is configured to be removed by the respective network device from the segment routing header without storing the segment routing header and without reconstructing the segment routing header;
cause the multicast data stream to be serially provided to the plurality of network devices identified in the segment routing header based on each of the plurality of network devices removing the information identifying the respective network device from the segment routing header; and
cause the multicast data stream to be provided to one or more user devices, via the plurality of network devices.

9. The source network device of claim 8, wherein the one or more processors are further configured to:
receive respective acknowledgements from the plurality of network devices identified in the segment routing header.

10. The source network device of claim 8, wherein the one or more processors are further configured to:
cause the multicast data stream to be provided to one or more user devices, via the plurality of network devices, with a particular quality of service.

11. The source network device of claim 8, wherein the segment routing header includes data identifying:
a length of the segment routing header,
a routing type associated with the multicast data stream, and
a quantity of segments remaining in the segment routing header.

12. The source network device of claim 8, wherein the network is a segment routing over an Internet protocol version 6 data plane network.

13. The source network device of claim 8, wherein state is maintained in the source network device.

14. The source network device of claim 8, wherein the segment routing header includes data identifying:
the source network device, and
each of the plurality of network devices.

15. A non-transitory computer-readable medium storing a set of instructions, the set of instructions comprising:
one or more instructions that, when executed by one or more processors of a source network device, cause the source network device to:
receive a multicast data stream to be provided to a plurality of network devices of a network;
generate, for the multicast data stream, a segment routing header that identifies the plurality of network devices to be provided the multicast data stream,
wherein the segment routing header includes data identifying the source network device and each of the plurality of network devices,
wherein information identifying a respective network device, of the plurality of network devices, is configured to be removed by the respective network device from the segment routing header without storing the segment routing header and without reconstructing the segment routing header; and
cause the multicast data stream to be serially provided to the plurality of network devices identified in the segment routing header based on each of the plurality of network devices removing the information identifying the respective network device from the segment routing header.

16. The non-transitory computer-readable medium of claim 15, wherein the one or more instructions, that cause the source network device to cause the multicast data stream to be serially provided to the plurality of network devices, cause the source network device to:
provide the segment routing header and the multicast data stream to a first network device, of the plurality of network devices, identified in the segment routing header, to cause the first network device to store the multicast data stream, remove a first identifier of the first network device from the segment routing header, and provide the segment routing header and the multicast data stream to a second network device, of the plurality of network devices, identified in the segment routing header.

17. The non-transitory computer-readable medium of claim 15, wherein the one or more instructions further cause the source network device to:
receive a negative acknowledgement from at least one of the plurality of network devices identified in the segment routing header;
determine that the multicast data stream is corrupted based on receiving the negative acknowledgement from the at least one of the plurality of network devices identified in the segment routing header; and
perform one or more actions based on determining that the multicast data stream is corrupted.

18. The non-transitory computer-readable medium of claim 17, wherein the one or more instructions, that cause the source network device to perform the one or more actions, cause the source network device to:
notify the plurality of network devices that the multicast data stream is corrupted;
prevent the multicast data stream from being provided to a user device; or
cause the plurality of network devices to remove the multicast data stream from storage.

19. The non-transitory computer-readable medium of claim 15, wherein the one or more instructions further cause the source network device to:
receive acknowledgements from the plurality of network devices identified in the segment routing header.

20. The non-transitory computer-readable medium of claim 15, wherein the one or more instructions further cause the source network device to:
cause the multicast data stream to be provided to one or more user devices, via the plurality of network devices, with a particular quality of service.

* * * * *